United States Patent
Bender

(10) Patent No.: US 7,099,629 B1
(45) Date of Patent: Aug. 29, 2006

(54) METHOD AND APPARATUS FOR ADAPTIVE TRANSMISSION CONTROL IN A HIGH DATA RATE COMMUNICATION SYSTEM

(75) Inventor: Paul E. Bender, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 726 days.

(21) Appl. No.: 09/707,569

(22) Filed: Nov. 6, 2000

(51) Int. Cl.
*H04B 1/00* (2006.01)
*H04B 7/00* (2006.01)

(52) U.S. Cl. .............................. 455/69; 455/68; 455/70; 455/434; 370/335; 370/342

(58) Field of Classification Search ................ 455/434, 455/68–70, 435.1–3; 370/347, 442, 458, 370/328–329, 331–332, 335–337, 342
See application file for complete search history.

(56) References Cited

U.S. PATENT DOCUMENTS

| | | | | |
|---|---|---|---|---|
| 6,044,074 A * | 3/2000 | Zehavi et al. | ................ | 370/350 |
| 6,075,989 A * | 6/2000 | Moore et al. | ................ | 455/436 |
| 6,188,767 B1 * | 2/2001 | Needham et al. | ........... | 380/271 |
| 6,389,056 B1 * | 5/2002 | Kanterakis et al. | ......... | 375/130 |
| 6,574,211 B1 * | 6/2003 | Padovani et al. | ........... | 370/347 |
| 6,631,123 B1 * | 10/2003 | Jiang et al. | ................. | 370/335 |
| 6,643,275 B1 * | 11/2003 | Gustafsson et al. | ......... | 370/328 |
| 6,687,233 B1 * | 2/2004 | Chen et al. | ................. | 370/253 |
| 2002/0172180 A1 * | 11/2002 | Hall et al. | ................... | 370/342 |
| 2003/0095513 A1 * | 5/2003 | Woodmansee et al. | ..... | 370/324 |
| 2003/0110440 A1 * | 6/2003 | Gutierrez, Jr. | .............. | 714/790 |
| 2004/0057397 A1 * | 3/2004 | Kanterakis et al. | ......... | 370/320 |

FOREIGN PATENT DOCUMENTS

| | | | |
|---|---|---|---|
| EP | 1001572 | * | 2/1999 |
| EP | 1001572 | * | 5/2000 |

OTHER PUBLICATIONS

U.S. Appl. No. 08/963,386, entitled "Method and Apparatus for High Rate Packet Data Transmission," filed Nov. 3, 1997; Paul E. Bender, QUALCOMM Inc., San Diego, California (USA).

* cited by examiner

*Primary Examiner*—Quochien B. Vuong
*Assistant Examiner*—Tuan Tran
(74) *Attorney, Agent, or Firm*—Philip Wadsworth; Sandra L. Godsey; Byron Yafuso

(57) ABSTRACT

In a high data rate communication system, a method and apparatus for efficiently establishing a connection between an access terminal and an access network using a fast access channel and a fast access indicator. Upon receiving a fast access indicator in response to a fast access probe, an access terminal begins transmitting a traffic channel signal containing data rate control (DRC) information. The DRC information is used by the access network to transmit messages such as a traffic channel assignment message at the requested DRC rate.

51 Claims, 12 Drawing Sheets

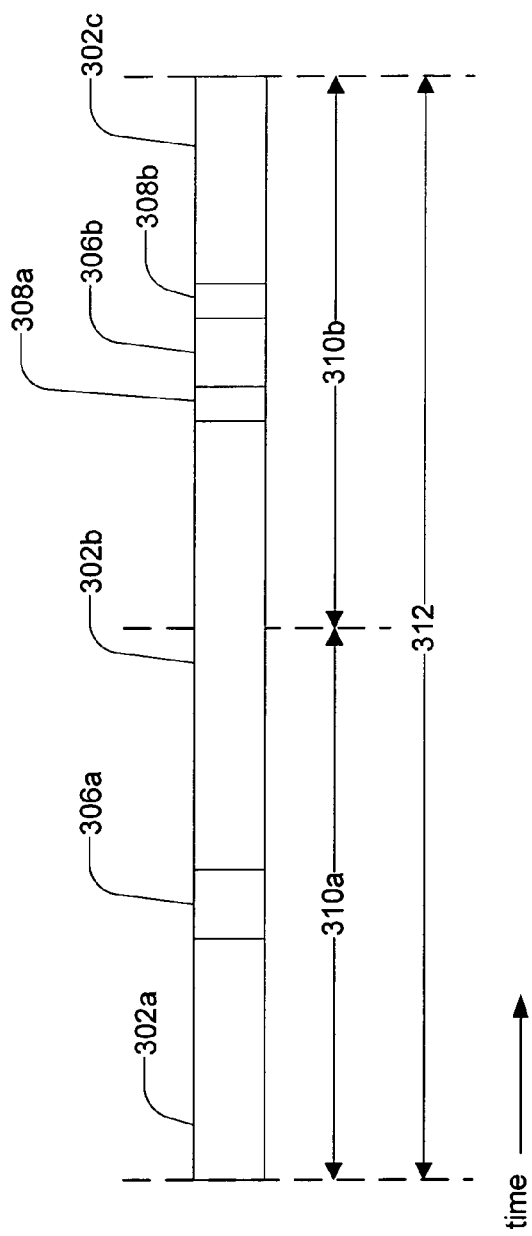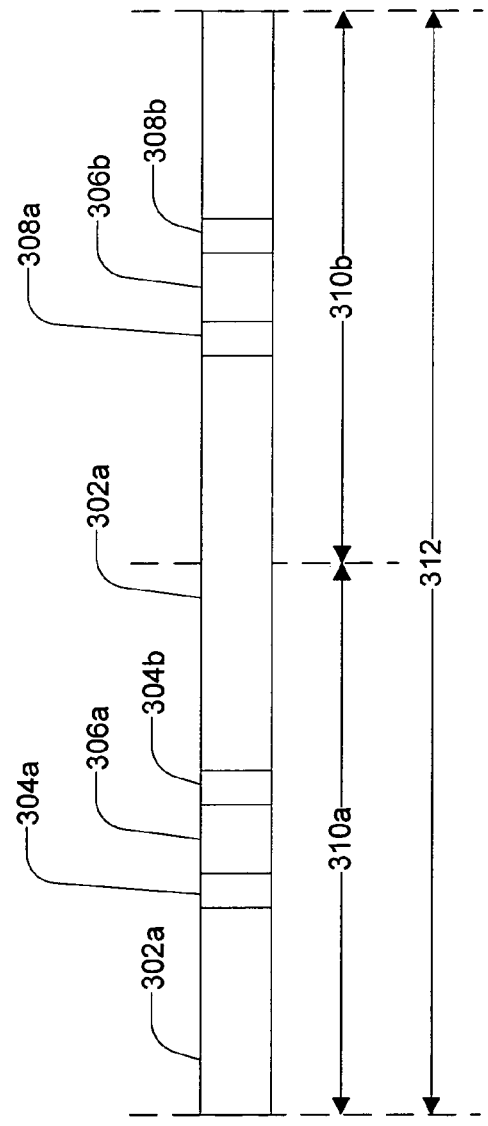
FIG. 3a
FIG. 3b

METHOD AND APPARATUS FOR ADAPTIVE TRANSMISSION CONTROL IN A HIGH DATA RATE COMMUNICATION SYSTEM

The current invention relates to wireless data communication. More particularly, the present invention relates to a novel and improved method and apparatus for allocating resources in a high data rate (HDR) wireless communication system.

In the accompanying drawings:

FIGS. 3a and 3b are diagrams of forward link channel structures.

OVERVIEW

The presently disclosed embodiments are directed to an improved method and apparatus of allocating traffic channel resources in a high data rate (HDR) wireless communication system. An example HDR system is described in U.S. patent application Ser. No. 08/963,386, now U.S. Pat. No. 6,574,211, issued Jun. 3, 2003, assigned to the assignee of the present application, incorporated herein by reference, and hereinafter referred to as the '386 application. In the '386 application, a system is described wherein an HDR-capable subscriber station transmits data on a reverse link using a CDMA waveform of multiple orthogonal channels. The access channel structure used in an HDR system is similar to that described in EIA/TIA-95B entitled "MOBILE STATION-BASE STATION COMPATIBILITY STANDARD FOR WIDEBAND SPREAD SPECTRUM CELLULAR SYSTEMS," familiar to those skilled in the art, and hereinafter referred to as "95B."

Figure 1:
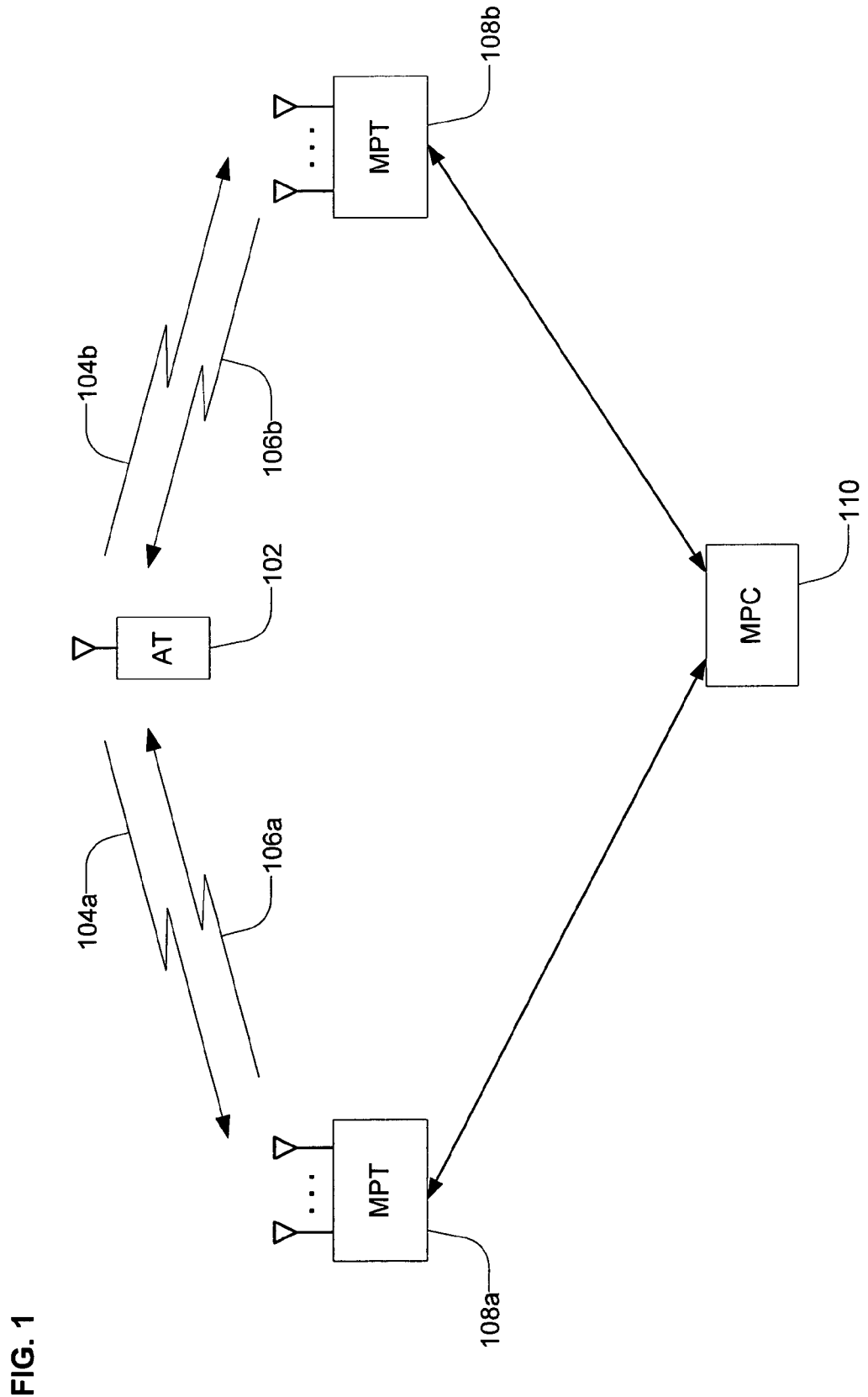
FIG. 1 is a diagram of an HDR communication system.

FIG. 1 is a diagram of an example HDR communication system. An HDR subscriber station, referred to herein as an access terminal (AT) 102, may be mobile or stationary, and may communicate with one or more HDR base stations, referred to herein as modem pool transceivers (MPTs) 108. An access terminal 102 transmits and receives data packets through one or more modem pool transceivers 108, to an HDR base station controller, referred to herein as a modem pool controller (MPC) 110. Modem pool transceivers and modem pool controllers are parts of a network called an access network (AN). An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including, but not limited to PC card, compact flash, external or internal modem, or wireless or wireline phone. The communication link through which the access terminal 102 sends signals to the modem pool transceiver 108 is called a reverse link 104. The communication link through which a modem pool transceiver 108 sends signals to an access terminal 102 is called a forward link 106.

The word "exemplary" is used exclusively herein to mean "serving as an example, instance, or illustration." Any embodiment described as an "exemplary embodiment" is not to be construed as necessarily preferred or advantageous over other embodiments described herein.

Figure 2A:
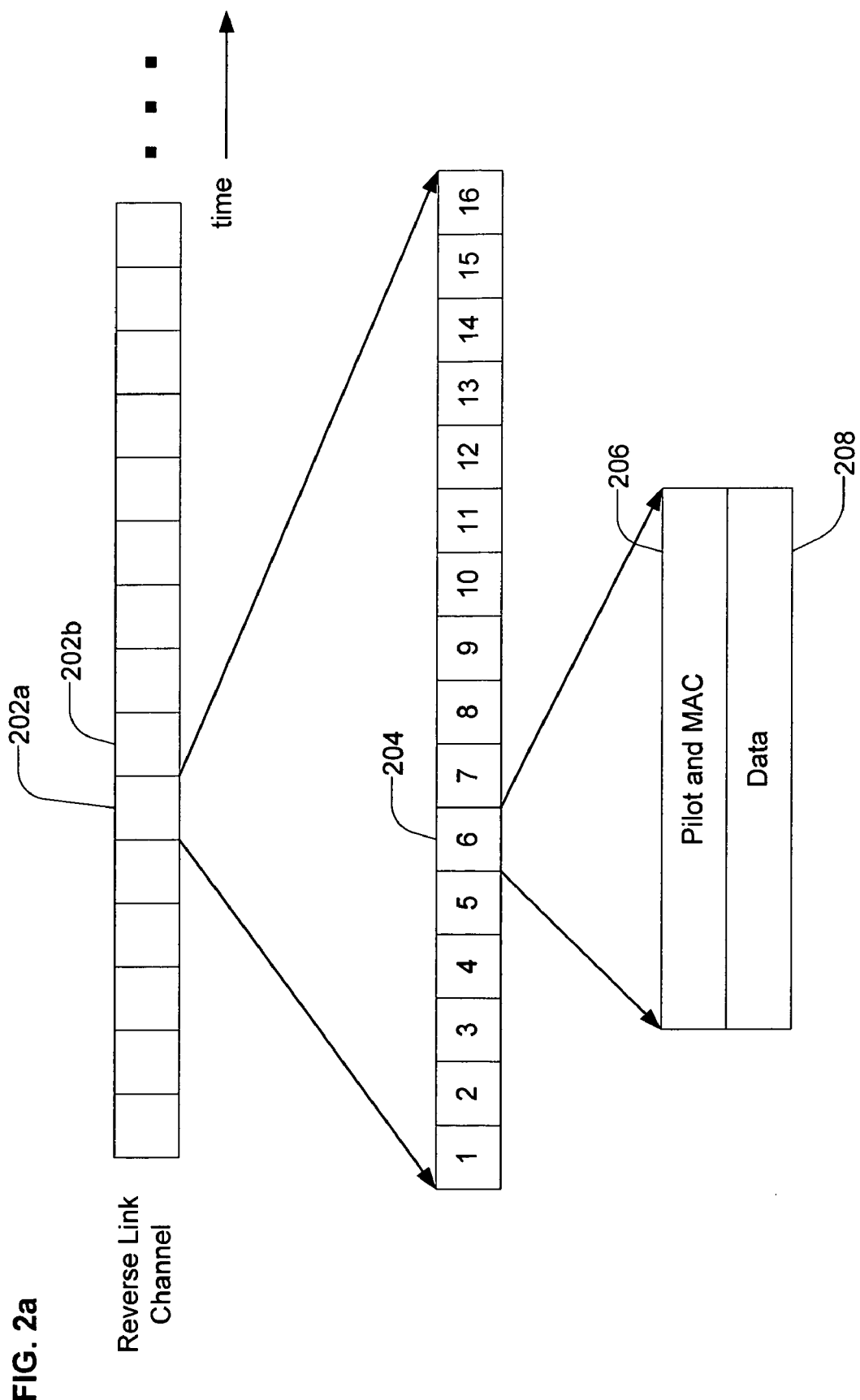
FIG. 2a is a diagram of a reverse link frame and time slot channel structure.

FIG. 2a is a diagram of an example reverse link channel structure. The reverse link channel is divided in time into a series of consecutive reverse link frames 202, with each frame being subdivided into a series of consecutive reverse link slots 204. The access terminal transmits a continuous stream of reverse link frames, with each reverse link frame 202b beginning in time at the end of the previous frame 202a. The time durations of the reverse link frames and slots may be constant, or may vary. In an exemplary embodiment, reverse link frames have a constant duration of 26.67 milliseconds, and consist of sixteen reverse link slots 204. In an exemplary embodiment, reverse link slots 204 have a constant duration of 1.667 milliseconds. An access terminal (not shown) may transmit pilot signals, medium access control (MAC) signals, and data signals during each time slot 204. The access terminal may also transmit a subset of the three signals during a particular slot 204. For example, the access terminal may transmit just a pilot signal, and not MAC or data signals during a particular slot 204. In an exemplary embodiment, the access terminal transmits pilot and MAC signals 250 as an in-phase component of the reverse link signal, and transmits data signals 252 as a quadrature-phase component of the reverse link signal.

Figure 2B:
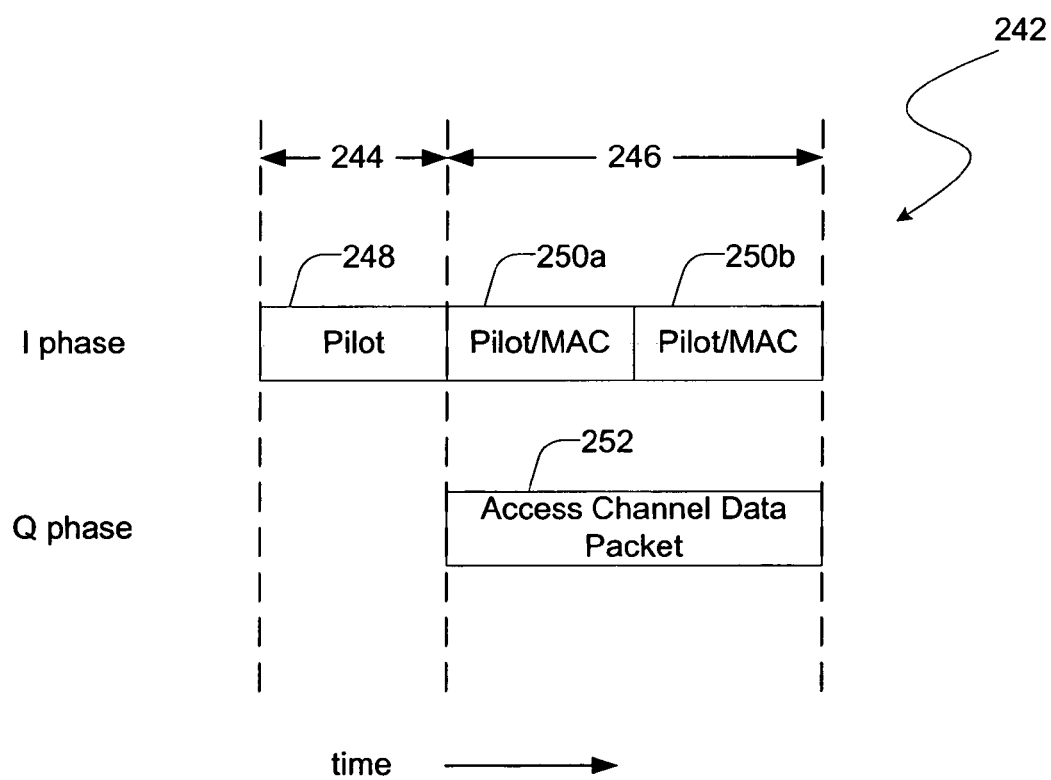
FIG. 2b is a diagram of a reverse link access probe structure.

In an exemplary embodiment, the types of reverse link channels include access channels and traffic channels, each of which further includes a data channel, a pilot channel, and a MAC channel. The MAC channel includes a reverse data rate control (DRC) channel and a reverse rate indicator (RRI) channel. In an exemplary embodiment, and as shown in FIG. 2b, the first part of a fast access probe 242 is a fast access probe preamble 244, during which a pilot signal 248 is transmitted. After transmitting a fast access probe preamble 244, the access terminal transmits a fast access probe body 246, including the pilot/MAC 250, and access channel data packet 252 signals. In an exemplary embodiment, the different portions of the fast access probe body 246 are transmitted using quadrature phase shift keying (QPSK). The pilot and MAC channel signal portion 250 of the fast access probe 242 are transmitted as the in-phase (I phase) portion of the reverse link signal. The access channel data packet 252 portion of the fast access probe 242 is transmitted as the quadrature-phase (Q phase) portion of the reverse link signal. In an exemplary embodiment, the access terminal does not transmit using the reverse DRC channel while transmitting a fast access probe 242. In an exemplary embodiment, the fast access probe preamble 244 has a duration of one frame 202 and the fast access probe body 246 has a duration of two frames 202. Alternatively, the durations of both the fast access probe preamble 244 and the fast access probe body 246 may be longer or shorter than as described above. For example, the fast access probe preamble 244 may be two frames long or the fast access probe body 246 may be one or three frames long.

The various portions of a fast access probe preamble 244 may alternately be arranged differently than the described exemplary embodiment without departing from the scope of the present invention. For example, the pilot, MAC, and access channel data packet signals could be separated using separate orthogonal spreading codes, distributed differently among the in-phase and quadrature-phase reverse link signal components, or time-division multiplexed.

FIG. 3a is a diagram of an example forward link channel structure. In an exemplary embodiment, a modem pool transceiver (not shown) transmits data in time slots of a fixed duration 312. Each time slot is divided into two half-slots 310a and 310b. In an exemplary embodiment, the time slots have a fixed length of 2048 symbol chips and a duration of 1.667 milliseconds, and each half-slot has a fixed length of 1024 symbol chips. One skilled in the art will recognize, however, that these lengths and durations may vary over time or have different values without departing from the scope of the present invention. In an exemplary embodiment, a data pilot burst 306 having a duration of 96 chips is transmitted at the center of each half-slot 310. In each frame 312, the modem pool transceiver transmits MAC channel signals 308 immediately before and after the data pilot burst 306b transmitted in the center of the latter half-slot 310b. The remaining portions 302 of each time slot 312 contain forward link packet data.

FIG. 3b shows an alternate embodiment of the example forward link channel structure of FIG. 3a. In FIG. 3b, an additional set of forward MAC channels 304 are transmitted immediately before and after the data pilot burst 306a transmitted in the center of the first half-slot 310a.

Figure 4:
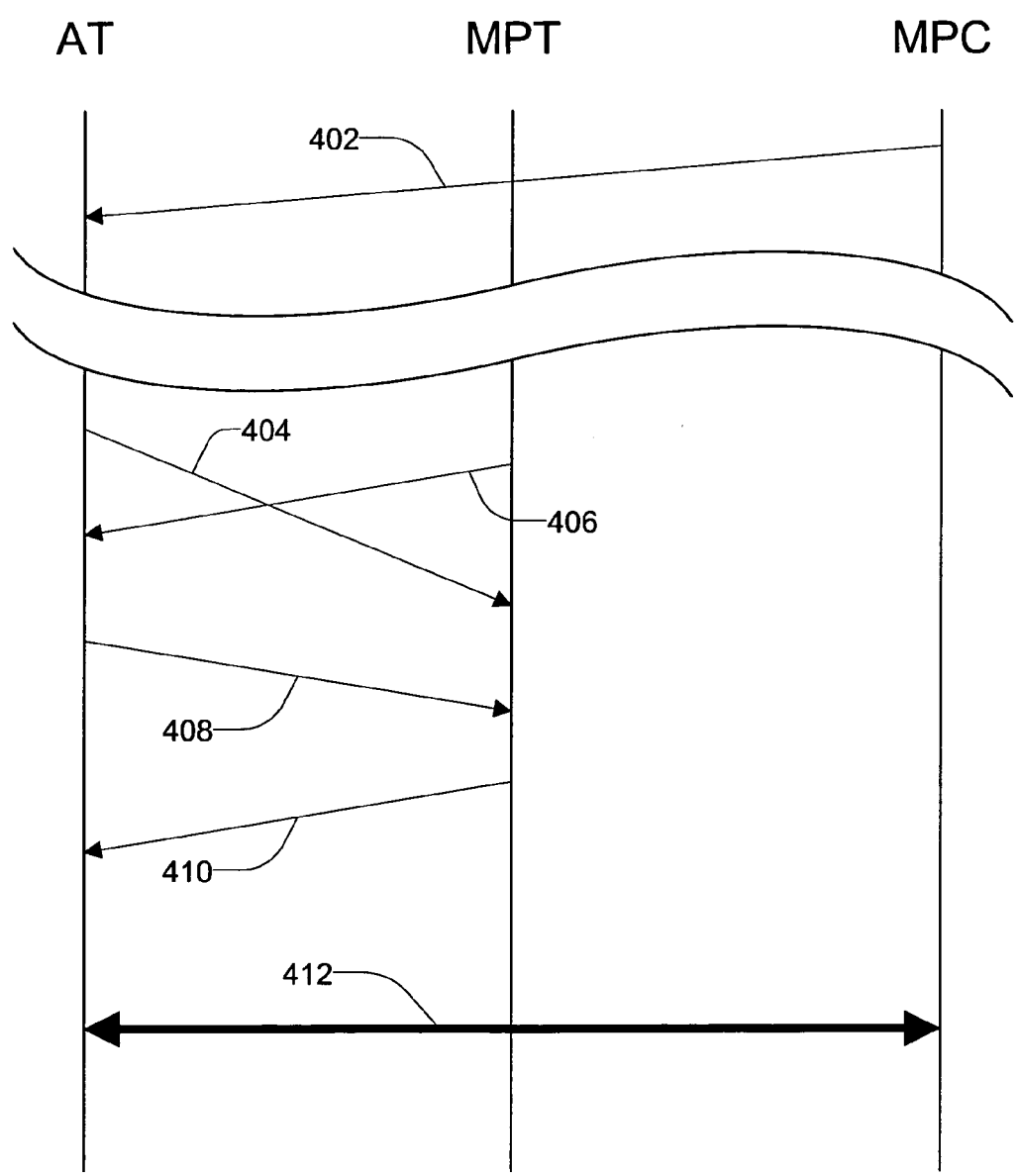
FIG. 4 is a diagram showing an exchange of messages used to establish a connection between an access terminal and an access network.

FIG. 4 is a diagram showing an example exchange of forward and reverse link messages between an access terminal (AT) and a modem pool transceiver (MPT). At some time before the access terminal attempts an access, the modem pool controller (MPC) assigns a universal access terminal identification (UATI) to the access terminal by sending a UATI assignment message 402 containing the UATI to the access terminal. When subsequently initiating a connection with a modem pool transceiver, the access terminal sends a fast access probe 404 containing a connection request message on a fast access channel. Upon detecting the fast access probe preamble, and without waiting to receive the fast access probe body portion of the fast access probe 404, the modem pool transceiver sends a fast access indicator 406. Upon detecting the fast access indicator, the access terminal then begins transmitting a reverse traffic signal 408. The reverse traffic signal 408 includes DRC information that allows the modem pool transceiver to transmit rate-controlled data to the access terminal. Upon complete decoding of the connection request message contained within the fast access probe 404 and the reverse traffic signal 408, the modem pool transceiver sends a combined message 410 on a fast connect reverse traffic channel. The combined message 410 contains an access acknowledgment message, a traffic channel assignment message, and a reverse traffic channel acknowledgment message. Because the modem pool transceiver receives a DRC signal from the access terminal within the reverse traffic signal 408, the combined message 410 can be sent at the requested DRC data rate. After the access terminal receives the combined message 410, the access terminal may begin exchanging data packets 412 with the modem pool controller through the modem pool transceiver.

DETAILED DESCRIPTION

In an exemplary embodiment, fast access channels are used to carry exclusively connection request messages. In an exemplary embodiment as shown in FIG. 4, an access terminal transmits a connection request message 404 on a fast access channel. In an exemplary embodiment, the access terminal chooses one of a plurality of fast access channels that are staggered in time. In addition to time staggering, the different fast access channels can be made more distinguishable by encoding each using a different pseudonoise (PN) long code mask. For example, the fast access channel long code mask may incorporate eight bits selected from the system time value in order to provide separate PN long codes for 256 fast access channels. In an alternate embodiment, three bits from the system time value are used in the fast access channel long code mask to provide eight fast access channels.

In an exemplary embodiment, the long code masks used to generate fast access channels are also different than the long code mask associated with the ordinary access channel. Messages sent on the ordinary access channel include registration messages, so the access network may not assume from the probe preamble that the probe body contains a connection request message. The access network therefore does not send a fast access indicator in response to probe preambles received on the ordinary access channel.

Upon detecting the preamble portion of the received fast access probe 404, the modem pool transceiver sends a fast access indicator 406 while continuing to decode the fast access probe body. The modem pool transceiver compares the signal quality of the received fast access probe preamble to a decoding threshold to determine whether to respond by sending a fast access indicator 406. This decoding threshold is chosen carefully so that, once the fast access probe preamble threshold has been met, it will be unlikely that a modem pool transceiver will fail to decode the following fast access probe body.

In an exemplary embodiment, the forward MAC channel comprises a plurality of code sub-channels, each identified by a MAC index and transmitted using a unique 32-ary Walsh cover. In one such embodiment, the fast access indicator 406 is sent using one of the code sub-channels included in the MAC channel. The code sub-channels may alternatively use Walsh covers of a different length, for example 64-ary or 128-ary Walsh covers. Furthermore, any other channelization technique may be used to distinguish sub-channels within the MAC channel. In an embodiment using 32-ary Walsh covers, the available MAC sub-channels are numbered from 1 to 31, where a MAC index i is assigned to the 32-ary Walsh function $W_i^{32}$, such that $W_1^{32}$, is the second Walsh code within the 32-ary Walsh function and Walsh code zero is not used.

The modem pool transceiver uses a subset of the 31 MAC code sub-channels to send reverse power control commands to access terminals. The gains of the MAC code sub-channels are normalized and individually scaled to control the total forward MAC channel power. In an exemplary embodiment, these gains are varied over time for efficient utilization of the total MAC channel transmit power while still maintaining reliable transmission of reverse power control (RPC) signals to active access terminal.

Each modem pool transceiver that establishes a connection with an access terminal assigns an RPC index from a set of RPC code channels. The RPC code channels comprise a subset of the modem pool transceiver's forward link MAC code sub-channels. The RPC index defines the Walsh cover used by the modem pool transceiver to transmit the RPC bit stream destined from the modem pool transceiver to that access terminal. Additionally, the RPC index may define the quadrature phase shift keying (QPSK) modulation phase (e.g., in-phase or quadrature) used to transmit the RPC bit stream. One RPC bit is transmitted to each active access terminal in each time slot. In an exemplary embodiment, the MAC channel transmissions 308a and 308b (from FIG. 3) each have a duration of 64 chips. The RPC bit is transmitted as four copies of the 32-ary Walsh function having an index i corresponding to the intended destination access terminal. Together, the four copies of the 32-ary Walsh function have the same length as the two 64-chip MAC channel periods 308a and 308b of each forward link time slot. In an exemplary embodiment, 600 RPC bits per second are transmitted to each active access terminal.

A greater RPC bit rate or number of MAC code sub-channels can be obtained by changing the rate of symbol repetition or the Walsh functions used. For example, an RPC bit rate of 1200 bits per second could be achieved by repeating each RPC bit twice in each slot instead of four times. Or a 64-bit Walsh function could be used to double the number MAC code sub-channels available for RPC signals to different access terminals, with each 64-bit Walsh function being transmitted twice in a slot (before and after the second data pilot burst 306b).

Turning back to FIG. 4, after receiving the fast access indicator 406, the access terminal begins transmitting a reverse traffic signal 408. In an exemplary embodiment, the reverse traffic signal 408 is sent on a fast connect reverse traffic channel, and consists of reverse link null traffic. Reverse link null traffic consists essentially of a pilot signal and a DRC signal, and contains no user data. In order to send the reverse traffic signal 408 before receiving a traffic channel assignment, the access terminal covers the DRC signal with a predetermined fast connect reverse traffic channel Walsh cover. In this way, the DRC signal within the reverse traffic signal 408 is specifically directed to the modem pool transceiver that sent the fast access indicator 406.

The use of a predetermined fast connect reverse traffic channel Walsh cover is one difference between a fast connect reverse traffic channel and a non-fast-connect traffic channel. In an exemplary embodiment, an access terminal in a traffic state is provided with a different DRC Walsh code for each modem pool transceiver in the access terminal's "active set." Active sets as described herein have been defined in numerous references including Telecommunications Industry Association standard TIA/EIA-95-B, and are well known in the art. The access terminal directs a DRC message to a selected modem pool transceiver by covering the DRC message with the Walsh code corresponding to the selected modem pool transceiver. Each modem pool transceiver in the access terminal's active set decovers the DRC signals from the access terminal using its corresponding DRC Walsh cover. Consequently, only the selected modem pool transceiver can correctly decode the DRC signal and send forward link data to the access terminal in a following forward link time slot. The DRC message symbols destined for a particular modem pool transceiver are exclusively OR'ed (XOR) with the corresponding Walsh code. When receiving DRC messages from an access terminal, a modem pool transceiver performs the same XOR operation using the Walsh code assigned to the modem pool transceiver for the access terminal. Since each modem pool transceiver in the active set of the mobile station is identified by a unique Walsh code, only the selected destination modem pool transceiver can correctly decode the DRC message.

However, the messages used to establish a traffic channel are sent before an active set has been identified, and before the access terminal receives Walsh code assignments for any modem pool transceivers. The predetermined fast connect reverse traffic channel Walsh cover is known by both access terminal and modem pool transceiver. Using this fast connect reverse traffic channel Walsh cover, the access terminal sends DRC messages to a modem pool transceiver prior to establishing a traffic channel. This enables the modem pool transceiver to send forward link messages to the access terminal at a controlled rate prior to establishing a traffic channel. Such pre-traffic-channel messages include access probe acknowledgment, reverse traffic channel acknowledgment, and traffic channel assignment messages.

The controlled rate is generally greater than the uncontrolled rate of the normal paging and other forward control channels. Because normal paging and other forward control channels are shared among all access terminals, they are transmitted at slow data rates to allow proper decoding by even access terminals operating under the worst interference conditions. For this reason, transmission of controlled-rate messages on the forward link is more efficient and consumes less forward link capacity. Even while the access terminal sends DRC signals on the reverse link, the modem pool transceiver may still opt to send forward link messages to the access terminal using an uncontrolled rate channel instead of a rate-controlled channel. For example, the modem pool transceiver may choose to send access acknowledgment messages, traffic channel assignment messages, or reverse traffic channel acknowledgments using the forward control channel. So, even while transmitting DRC messages on a fast connect reverse traffic channel, the access terminal continues to monitor the normal paging and forward control channels.

When transmitting a fast access indicator 406, the modem pool transceiver continues to receive the fast access probe body portion of the fast access probe 404. Upon successfully decoding all portions of the fast access probe 404, the modem pool transceiver may send an access probe acknowledgment message. The access probe acknowledgment message indicates the successful, complete decoding of the fast access probe 404.

In an exemplary embodiment, an access terminal is assigned a universal access terminal identification (UATI) prior to establishing a connection to the access network. The UATI is associated with specific resources within a modem pool controller, for example a reverse link protocol (RLP) state entry in a table within the modem pool controller. The modem pool transceiver does not assign the UATI, but includes the UATI with any traffic state messages forwarded to the modem pool controller after being received from the access terminal. In an exemplary embodiment, the UATI is also the Internet protocol (IP) address of the modem pool transceiver within the wireless network, and remains assigned to the access terminal even after the access terminal leaves the traffic state. When an access terminal establishes a new connection, a UATI obtained previously can be sent in a connection request message within the fast access probe 406. If the modem pool controller has not reassigned network resources associated with the UATI, the same resources can be immediately reallocated to the access terminal for the new connection. This allows the access terminal to transmit reverse link data instead of just null traffic over the fast connect reverse traffic channel. Because the access terminal already has a UATI that is equivalent to an IP address, reverse link packets bearing that UATI can be routed even before the access terminal receives a traffic channel allocation.

In an exemplary embodiment, the connection request message includes the UATI. After successfully decoding the UATI from the connection request message in the fast access probe 406, the modem pool transceiver can determine the reverse link PN long code used by the access terminal and acquire the reverse traffic signal 408. Once the reverse traffic signal 408 is successfully acquired, the modem pool transceiver can decode DRC messages and send access probe acknowledgment, reverse traffic channel acknowledgment, and traffic channel assignment messages at the requested DRC rate. The access network can send the traffic channel assignment message either before or after actually allocating a traffic channel.

In an exemplary embodiment, the modem pool transceiver may send the access probe acknowledgment, reverse traffic channel acknowledgment, and traffic channel assignment message individually or may combine two or more of the messages into a single forward link message. The forward link messages may be sent over a forward common control channel or a forward rate-controlled controlled common channel. The forward common control channel is sent at a constant, relatively low data rate. The data rate of the forward rate-controlled common channel is determined according to DRC messages transmitted over the fast connect reverse traffic channel.

In an exemplary embodiment, the forward rate-controlled common channel is distinguished from the forward common control channel using a predetermined forward rate-controlled common channel Walsh code. This Walsh code is used to cover the preamble of forward link messages sent over the forward rate-controlled common channel. In this way, an access terminal that transmits DRC messages on the fast connect reverse traffic channel can distinguish corresponding forward link responses from forward traffic channel transmissions to other access terminals. In an exemplary embodiment, the modem pool transceiver uses a 32-ary Walsh cover to distinguish the forward rate-controlled common channel from other forward traffic channels. Alternatively, longer or shorter Walsh covers may be used.

After acquiring the reverse traffic signal 408, the modem pool transceiver can decode the DRC information received in the reverse traffic signal 408. The modem pool transceiver may then send forward link messages to the access terminal using the forward rate-controlled common channel at the data rate specified by the received DRC signal. In an exemplary embodiment, the modem pool transceiver sends all three messages (access probe acknowledgment, traffic channel assignment, and reverse traffic channel acknowledgment) within a combined forward link message 410 over the forward rate-controlled common channel. If the specified DRC data rate is sufficiently fast, the combined forward link message 410 may be sent in a single forward link frame, perhaps even within a single forward link time slot.

Once the access terminal receives the reverse traffic channel acknowledgment and the traffic channel assignment message, the access terminal may begin transmitting and receiving on a traffic channel. The traffic channel assignment message specifies each DRC Walsh cover that the access terminal must use in directing DRC messages to each modem pool transceiver in its active set. The Walsh cover used for fast connect reverse traffic channel signals may be used for traffic channel transmissions, and may be specified in the traffic channel assignment message.

Figure 5:
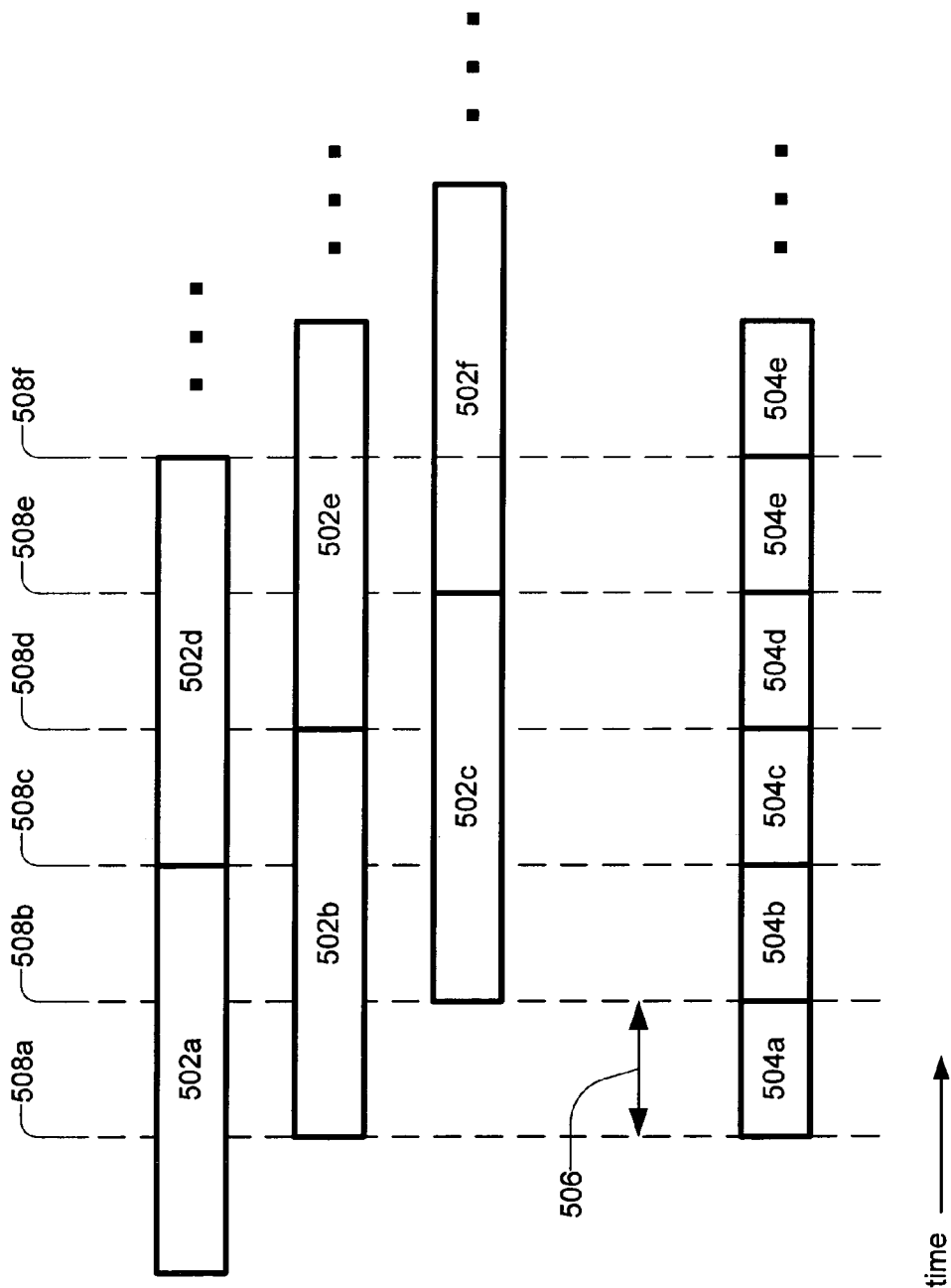
FIG. 5 is a diagram showing the structure of staggered fast access channels and a fast access indicator channel.

FIG. 5 is a diagram showing an example structure for a fast access indicator channel and three staggered fast access channels. Two fast access probe periods 502 are shown for each of three separate fast access channels. Fast access probe periods 502a and 502d correspond to a first fast access channel. Fast access probe periods 502b and 502e correspond to a second fast access channel. Fast access probe periods 502c and 502f correspond to a third fast access channel.

In an exemplary embodiment, the fast access channels are staggered in time, such that a fast access probe 502 that spans multiple reverse link frames may be transmitted beginning on any fast access probe boundary 508. A different long code mask is used for each of the different fast access channels to allow the modem pool transceiver to distinguish the different channels received. In an exemplary embodiment, eight bits are extracted from the system time to form the PN long code mask used to generate fast access channel signals. Using eight bits enables a modem pool transceiver to receive probes on as many as 256 fast access channels, each having a different long code mask. One skilled in the art will recognize that the techniques described above may alternatively be used to create a greater or lesser set of long code masks for use with a greater or lesser number of fast access channels.

As discussed above, a modem pool transceiver may receive connection request messages from access terminals through a plurality of fast access channels that are staggered in time. In an exemplary embodiment, a single fast access indicator channel is used to send fast access indicators in response to access probe preambles received on all fast access channels. An access terminal determines which fast access channel is being acknowledged based on the timing of the signal transmitted on the fast access indicator channel. In other words, the fast access indicator channel is time domain multiplexed in order to send fast access indicators corresponding to the different staggered fast access channels.

In an exemplary embodiment, the fast access indicator is covered using a fast access indicator Walsh code associated with a MAC code sub-channel that is reserved exclusively for sending fast access indicators. In an exemplary embodiment, the fast access channels are staggered in time using a fixed offset or "staggering distance." For example, the staggering distance may be one frame (16 time slots) or two frames (32 time slots) or a distance less than a frame such as 8 time slots. The fast access indicator channel is time division multiplexed into separate fast access indicator slots 504 having a duration equal to the staggering distance 506. In the exemplary embodiment illustrated in FIG. 5, the duration of a fast access probe preamble is one frame and is equal to the staggering distance 506. Thus, one fast access indicator slot 504 is available for responding to a fast access probe preamble received on each fast access channel. Though the fast access indicator slots 504 are shown as beginning and ending exactly on reverse link frame boundaries 508, they may be offset to allow time for processing of access probe preambles in the modem pool transceiver. For example, the beginning of a fast access indicator slot 504a may begin one or two time slots later than the previous frame boundary 508a. In the exemplary embodiment illustrated in FIG. 5, a fast access indicator sent during a fast access indicator slot 504*b* corresponds to a fast access probe preamble received during the immediately preceding fast access probe preamble period (from 508*a* to 508*b*).

In an exemplary embodiment, a fast access indicator is a single bit covered with the fast access indicator Walsh code and repeated during each forward link time slot of a fast access indicator slot 504. When no fast access probe preamble is detected on a fast access channel, the modem pool transceiver reverses the sign of the bit covered with the fast access indicator Walsh code and transmitted during the associated fast access indicator slot 504. Alternatively, when no fast access probe preamble is detected on a fast access channel, the modem pool transceiver transmits no signal during the associated fast indicator slot 504, or transmits the fast access indicator signal at approximately zero power.

Figure 6:
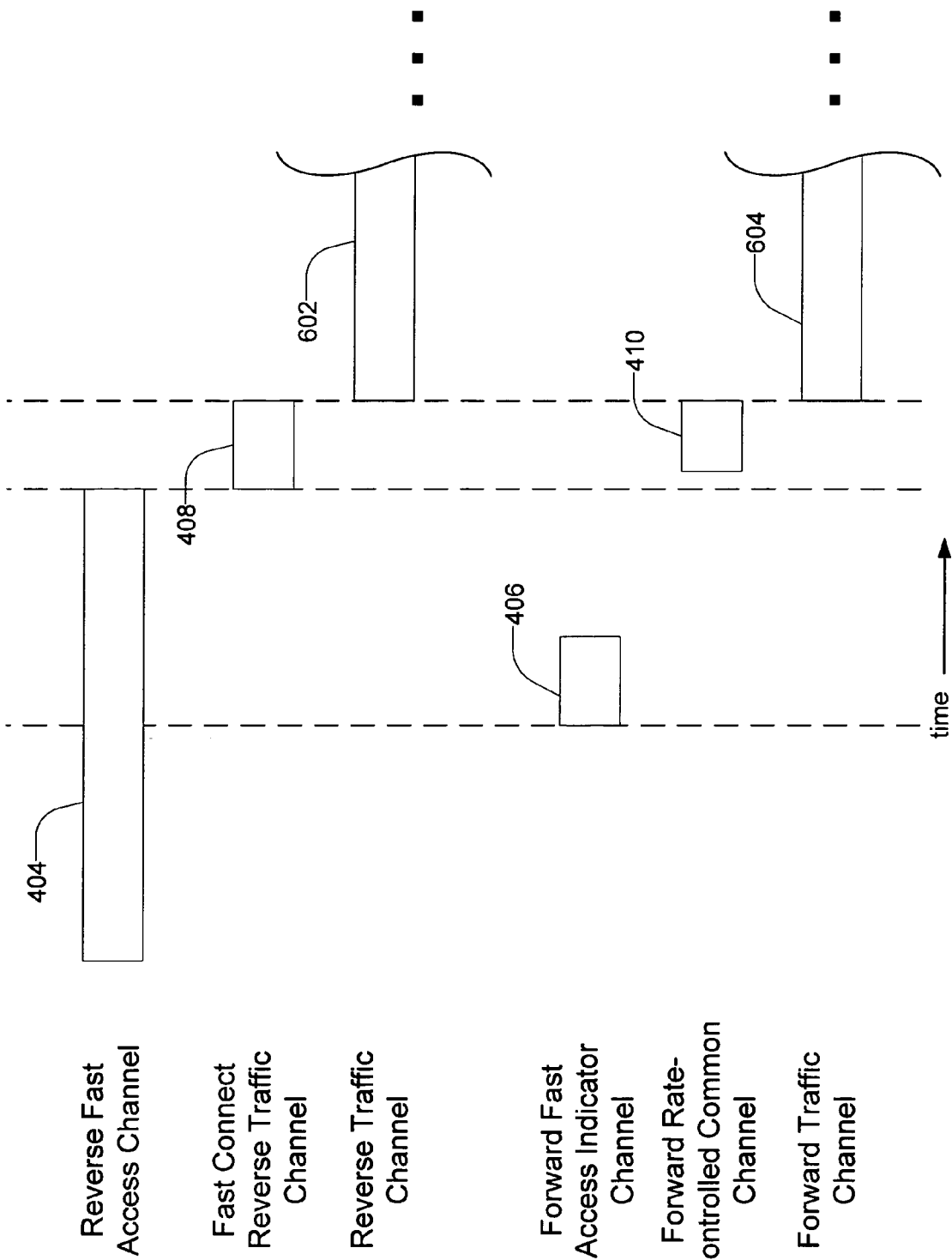
FIG. 6 is a diagram showing a fast access probe message sequence.

FIG. 6 is a diagram showing an example fast access probe message sequence. An access terminal transmits a fast access probe 404 containing a connection request message on a fast access channel. The fast access probe 404 includes a fast access probe preamble followed by a fast access probe body. Upon detecting the fast access probe preamble, the modem pool transceiver transmits a fast access indicator 406 on a fast access indicator channel. Upon completing transmission of the fast access probe 404 and receiving the fast access indicator 406, the access terminal begins transmitting a reverse traffic signal 408. As discussed above, until the access terminal receives a traffic channel assignment, the reverse traffic signal 408 is sent over a fast connect reverse traffic channel having a predetermined DRC Walsh cover.

In an exemplary embodiment, upon assigning a traffic channel and acquiring the reverse traffic signal 408, the modem pool transceiver sends the access terminal a combined message 410 containing access probe acknowledgment, traffic channel assignment, and reverse traffic channel acknowledgment messages. As discussed above, the combined message 410 is sent at the rate specified in the DRC signal received from the access terminal on the fast connect reverse traffic channel. After sending the traffic channel assignment, for example as part of the combined message 410, the modem pool transceiver begins sending forward link traffic 604 on the forward link traffic channel. After receiving the reverse traffic channel acknowledgment message, for example as part of the combined message 410, the access terminal begins sending data 602 on the reverse link traffic channel.

Figure 7:
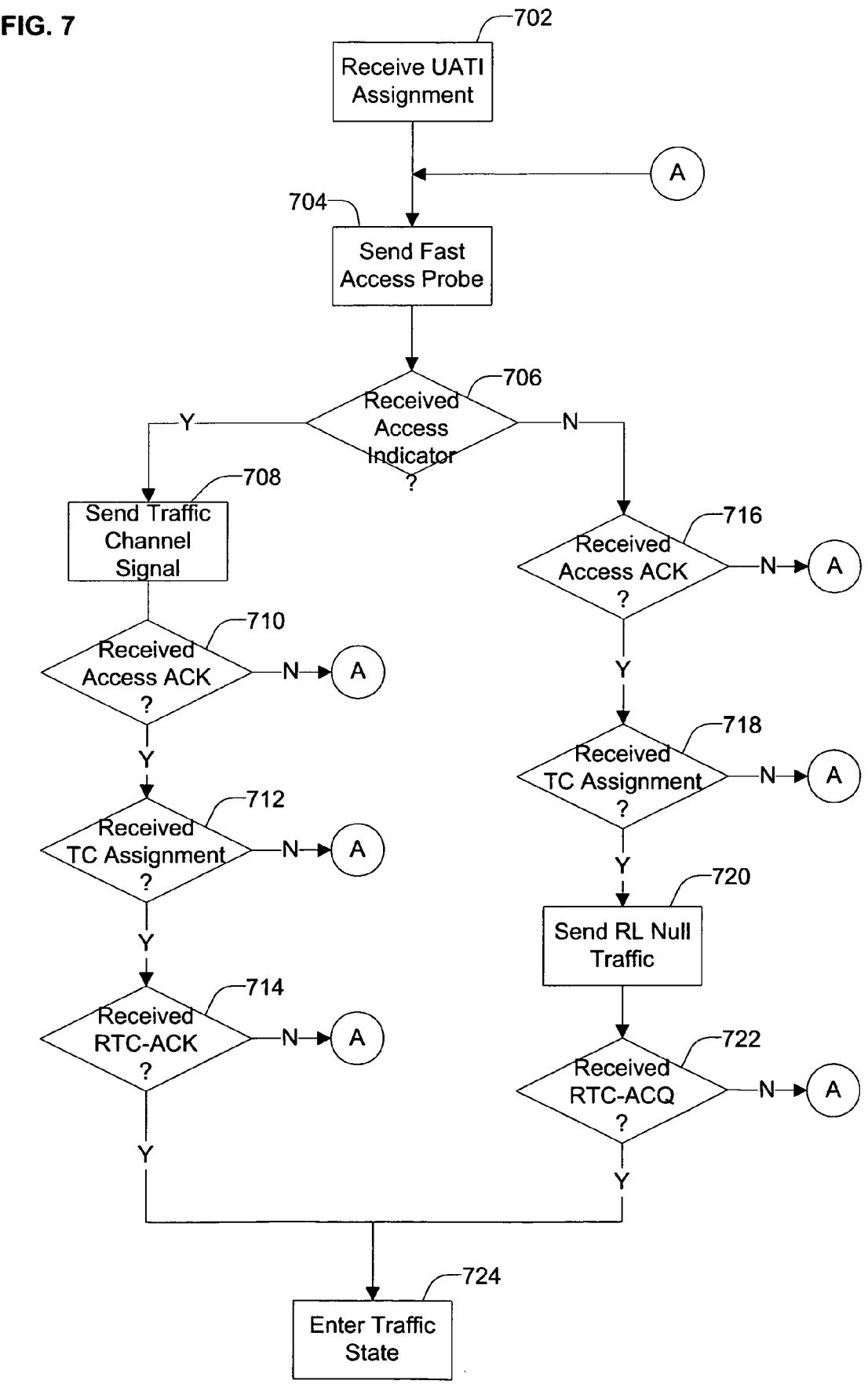
FIG. 7 is a flowchart showing an access terminal process for establishing a connection using a fast access channel.

FIG. 7 is a flowchart of an example access terminal process for establishing a connection using a fast access channel. As discussed above, in step 702 the access terminal obtains a universal access terminal identification (UATI) from the access network prior to establishing a connection. Then, in step 704 in establishing a new connection, the access terminal sends a fast access probe on a fast access channel of a target modem pool transceiver. The fast access probe includes a fast access probe preamble followed by a fast access probe body containing a connection request message. In an exemplary embodiment, the access terminal monitors a forward link channel transmitted by the target modem pool transceiver before sending a fast access probe in order to determine whether the target modem pool transceiver supports fast access probe transmission.

Upon decoding the fast access probe preamble, the target modem pool transceiver sends a fast access indicator indicating that it has successfully decoded at least the first portion of the fast access probe. In step 706, the access terminal monitors a forward link fast access indicator channel to determine whether the target modem pool transceiver sends a corresponding fast access indicator. In an exemplary embodiment, the access terminal detects signals on the fast access indicator channel by decovering the associated forward link MAC code sub-channel using a 32-ary Walsh function dedicated to transmitting fast access indicator signals. In an exemplary embodiment, the access terminal attempts to decode the fast access indicator from one of multiple MAC code sub-channels during a predetermined period immediately after transmitting the fast access probe preamble.

If, in step 706, the access terminal detects a fast access indicator corresponding to the fast access probe preamble, the access terminal begins transmitting a fast connect reverse traffic channel signal in step 708. While transmitting the fast connect reverse traffic channel signal in step 708, the access terminal also sends DRC signals requesting a data rate at which signals may be received over the forward rate-controlled common channel. While transmitting 708 the fast connect reverse traffic channel signal, the access terminal monitors the forward link and attempts to decode additional messages used to establish a traffic channel connection. The access terminal monitors both the forward rate-controlled common channel and the forward common control channel to decode an access acknowledgment (ACK) in step 710, decode a traffic channel (TC) assignment in step 712, or decode a reverse traffic channel acknowledgment message (RTC-ACK) in step 714. As discussed above, these three messages may be received individually or in a combined message over the forward rate-controlled forward channel at the specified DRC data rate. Upon successfully decoding a reverse traffic channel acknowledgment in step 714, the access terminal enters the traffic state in step 724, and can begin sending and receiving data packets through the modem pool transceiver.

In an exemplary embodiment, the access terminal waits a predetermined amount of time to receive each of the access acknowledgment, traffic channel assignment, and reverse traffic channel acknowledgment messages. If a message is not received within the predetermined timeout period, the access terminal aborts and sends another fast access probe in step 704. The timeout values associated with each of the different messages may be the same or different. For example, the access terminal may have a longer timeout period associated with the reverse traffic channel acknowledgment than with the traffic channel assignment. Consequently, if neither message is received, the access terminal will abort when the timeout period associated with the traffic channel assignment expires.

The access terminal checks for the expiration of the access acknowledgment timeout in step 710, then checks for the expiration of the traffic channel assignment timeout in step 712, and lastly checks for the expiration of a reverse traffic channel acknowledgment timeout in step 714. If the access acknowledgment timeout expires in step 710, then the access terminal aborts and starts over 704. If the traffic channel assignment timeout expires 712, then the access terminal aborts and sends another fast access probe in step 704. If the reverse traffic channel acknowledgment timeout expires in step 714, then the access terminal aborts and sends another fast access probe in step 704. The order of the timeout checks depends on the different timeout values and may be different without departing from the described embodiment. In an exemplary embodiment, after the expiration of a timeout for any of the three messages, the access terminal sends an ordinary access probe instead of a fast access probe in step 704.

If, in step 706, the access terminal does not detect a corresponding fast access indicator, then the access terminal does not transmit a reverse link traffic channel signal. Because the access terminal is not transmitting DRC signals, the access terminal does not monitor the forward rate-controlled common channel for forward link messages. Instead, the access terminal monitors the forward control channel in order to decode additional messages used to establish a traffic channel connection. The access terminal attempts to decode an access acknowledgment (ACK) in step 716 and decode a traffic channel assignment message in step 718. Upon successfully decoding a traffic channel assignment message in step 718, the access terminal begins transmitting a reverse link traffic channel (TC) using the traffic channel parameters specified in the received traffic channel assignment in step 720. Thereafter, in step 722, the access terminal may decode a reverse traffic channel acknowledgment (RTC-ACK) on either the forward link traffic channel or the forward control channel. Upon successfully decoding a reverse traffic channel acknowledgment in step 722, the access terminal enters the traffic state in step 724, and can begin sending and receiving data packets through the modem pool transceiver.

If the access terminal fails to decode an access acknowledgment, traffic channel assignment, or reverse traffic channel acknowledgment within predetermined timeout periods, the access terminal aborts and sends another fast access probe in step 704. Alternatively, after failing a first access attempt, the access terminal may make a second access attempt using an ordinary access probe instead of a fast access probe.

Figure 8:
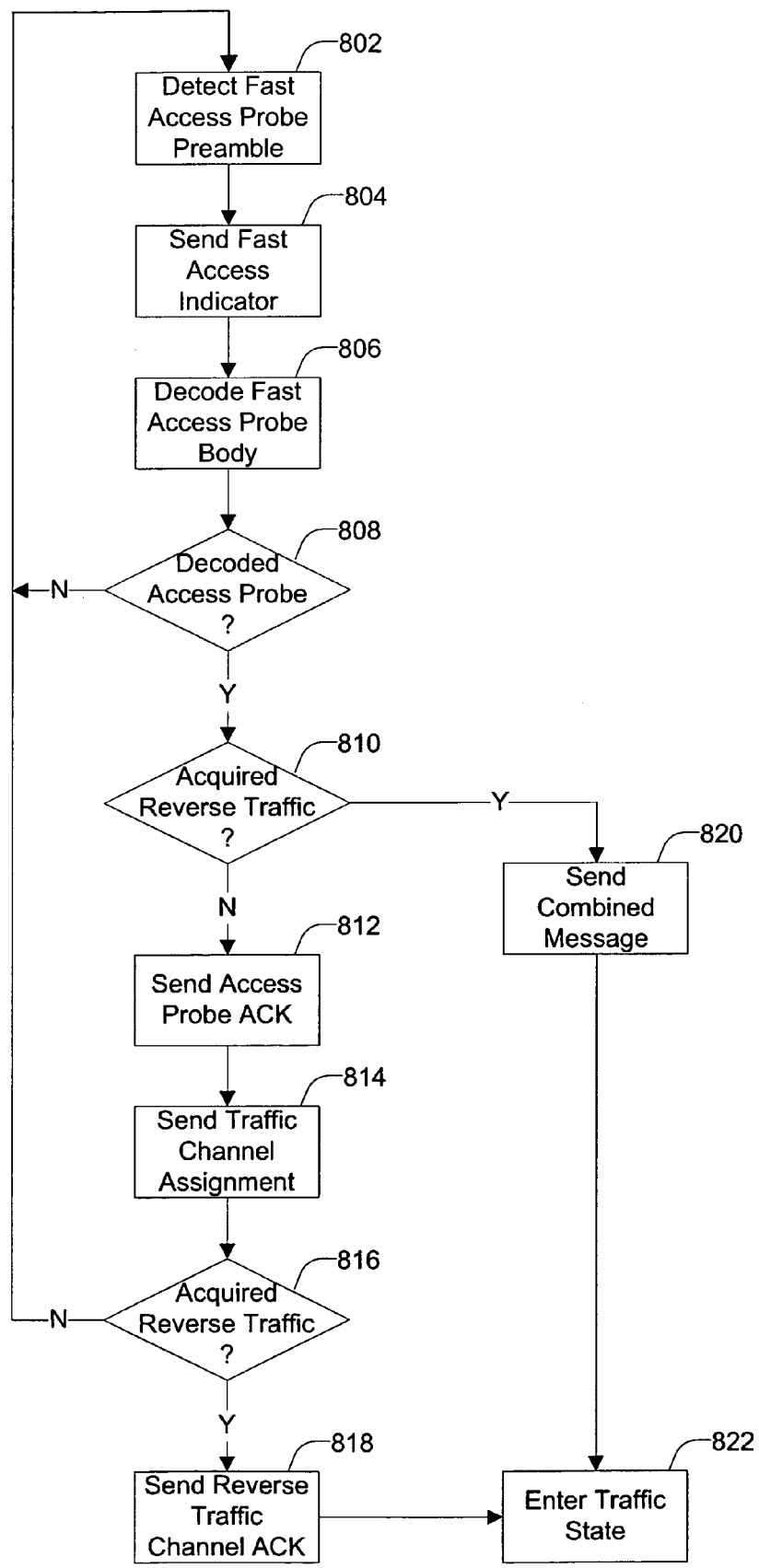
FIG. 8 is a flowchart of a modem pool transceiver process for establishing a connection using a fast access channel.

FIG. 8 is a flowchart of an example modem pool transceiver process for establishing a connection using a fast access channel. Upon receiving a fast access probe preamble on a fast access channel from an access terminal in step 802, the modem pool transceiver sends a fast access indicator in step 804. As discussed above, the fast access indicator may be sent using one of a plurality of MAC code sub-channels.

While sending the fast access indicator, the modem pool transceiver continues to decode the fast access probe body in step 806 in order to complete the decoding of the fast access probe. If a valid connection request message within the fast access probe body is successfully decoded in step 808, the modem pool transceiver attempts, in step 810, to acquire the fast connect reverse traffic channel signal transmitted by the access terminal. Upon acquiring the corresponding fast connect reverse traffic channel the modem pool transceiver extracts DRC information to determine the forward data rate requested by the access terminal. Forward link messages sent to the access terminal may subsequently be transmitted at the requested DRC data rate. These messages include access acknowledgment, traffic channel assignment, and reverse traffic channel acknowledgments. The modem pool transceiver may send these messages individually or combined within a single message. As described above, the modem pool transceiver may transmit these messages using the forward rate-controlled common channel or the forward control channel. In an exemplary embodiment, in step 820, the modem pool transceiver sends all three messages as a single combined message over the forward rate-controlled common channel. After sending the reverse traffic channel acknowledgment either individually or in a combined message the modem pool transceiver enters the traffic state in step 822.

If the modem pool transceiver does not acquire the fast connect reverse traffic channel in step 810, then in step 812 the modem pool transceiver sends the access probe acknowledgment (ACK) and in step 814 sends the traffic channel assignment in response to the received access probe. The modem pool transceiver then monitors the reverse traffic channel specified in the traffic channel assignment. Upon acquiring the reverse traffic channel in step 816, the modem pool transceiver sends a reverse traffic channel acknowledgment in step 818 and enters the traffic state in step 822. Upon failing to acquire the reverse traffic channel in step 816, the modem pool transceiver aborts and resumes attempting to detect an access probe in step 802.

Figure 9:
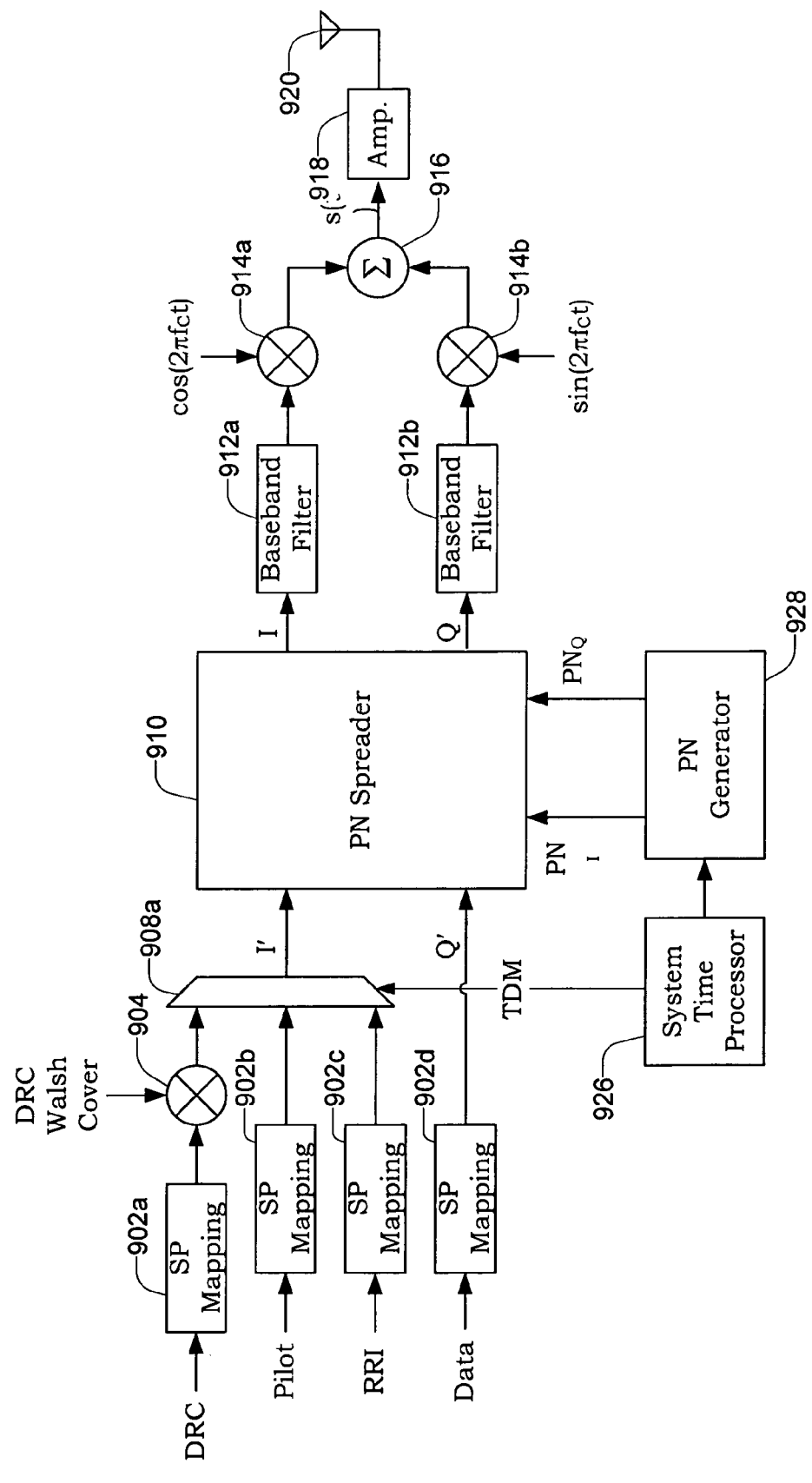
FIG. 9 shows an access terminal apparatus.

FIG. 9 shows an example access terminal apparatus. In the example apparatus, pilot, reverse rate indicator (RRI), DRC, and data signals are signal point mapped in signal point (SP) mapping units 902. In an exemplary embodiment, SP mapping units 902 perform bi-phase mapping, and convert 0, 1 to +1, −1 respectively. The DRC signal is covered using a DRC cover in mixer 904. When the access terminal is in the traffic state, the DRC cover corresponds to a selected modem pool transceiver having the greatest DRC rate. When the access terminal not in the traffic state, but is transmitting over a fast connect reverse traffic channel, the DRC cover is a predetermined fast connect reverse traffic channel Walsh cover.

In an exemplary embodiment, the pilot signal has a constant value, such that the corresponding SP mapping unit 902b is omitted. The resulting pilot, RRI and DRC signals are time division multiplexed in a time division multiplexing (TDM) module 908. Alternatively, the mixer 904 may be replaced with an XOR unit, and the DRC signal point mapping unit 902a may be moved between the XOR unit and the TDM module 908. If the mixer 904 is replaced by an XOR units, the signal point mapping units 902 may be moved such that there is instead a single signal point mapping unit between the TDM module 908 and a PN spreader 910.

In an alternate embodiment, the DRC signals are not time division multiplexed with the pilot and RRI signals. Instead, the pilot and RRI signals are time domain multiplexed, and the resulting multiplexed signal is multiplied by a first Walsh code. The DRC signal is multiplied by a second Walsh code that is orthogonal to the first Walsh code. The resulting Walsh-spread DRC signal is then added to the Walsh-spread pilot and RRI signals to form a signal to be spread in PN spreader 910. In an alternate embodiment, the Walsh-spread DRC signal is individually gain-controlled relative to the Walsh-spread pilot and RRI signals.

The multiplexed signals for the in-phase (I') component of the input to the PN spreader 910. In an alternate embodiment, the pilot, RRI and DRC signals are code multiplexed, for example using different orthogonal Walsh codes. The data signal constitutes the quadrature-phase (Q') component of the input to the PN spreader 910. One skilled in the art will recognize that the pilot, RRI, DRC and data signals may be arranged in different combinations than those shown to form the I' and Q' signals. Also, some or all of the pilot, RRI, DRC and data signals may be added to both I' and Q' signals. A complex PN generator 928 generates a complex PN code having an in-phase component ($PN_I$) and a quadrature-phase component ($PN_Q$). In an embodiment, the PN spreader 910 complex-multiplies the complex input I' and Q' by the complex PN code $PN_I$ and $PN_Q$ according to the equations:

$$I = I'PN_I - Q'PN_Q$$

$$Q = I'PN_Q + Q'PN_I$$

In an alternate embodiment, the PN spreader 910 multiplies the complex input I' and Q' by a single real PN sequence according to the equations:

$$I = I'PN$$

$$Q = Q'PN$$

Alternatively, other complex or real multiplication equations may be used. One skilled in the art will recognize that complex or real PN codes may be generated in a variety of ways.

The output of the PN spreader 910 is a complex signal having I and Q components. Each of these components is filtered using baseband filters 912 before being upconverted in mixers 914 as shown. The outputs of the mixers 914 are then added in a summer 916 to form the reverse link signal to be amplified in an amplifier 918 and transmitted through an access terminal antenna 920.

Figure 10A:
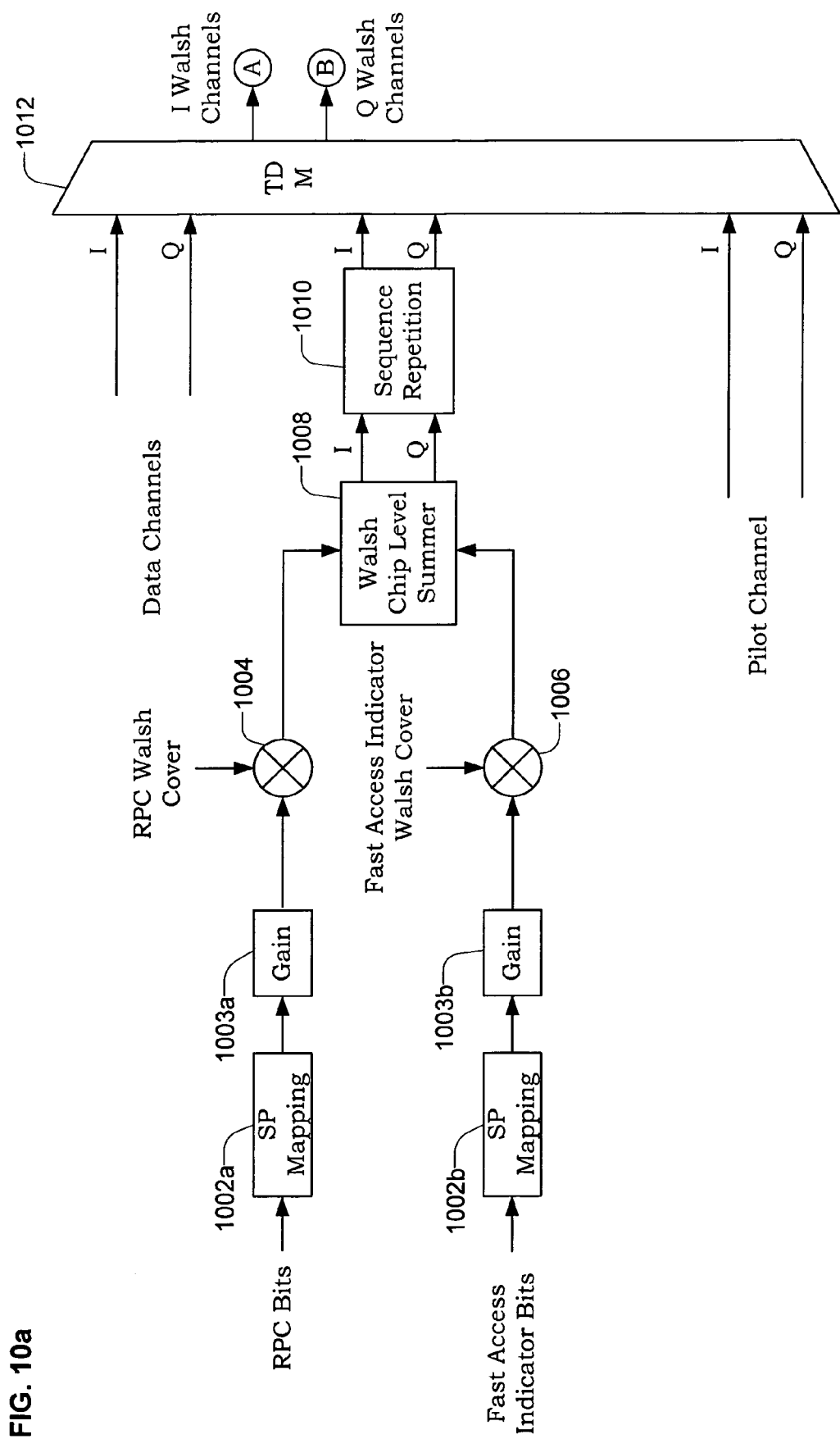
FIGS. 10a and 10b show a modem pool transceiver apparatus.
Figure 10B:
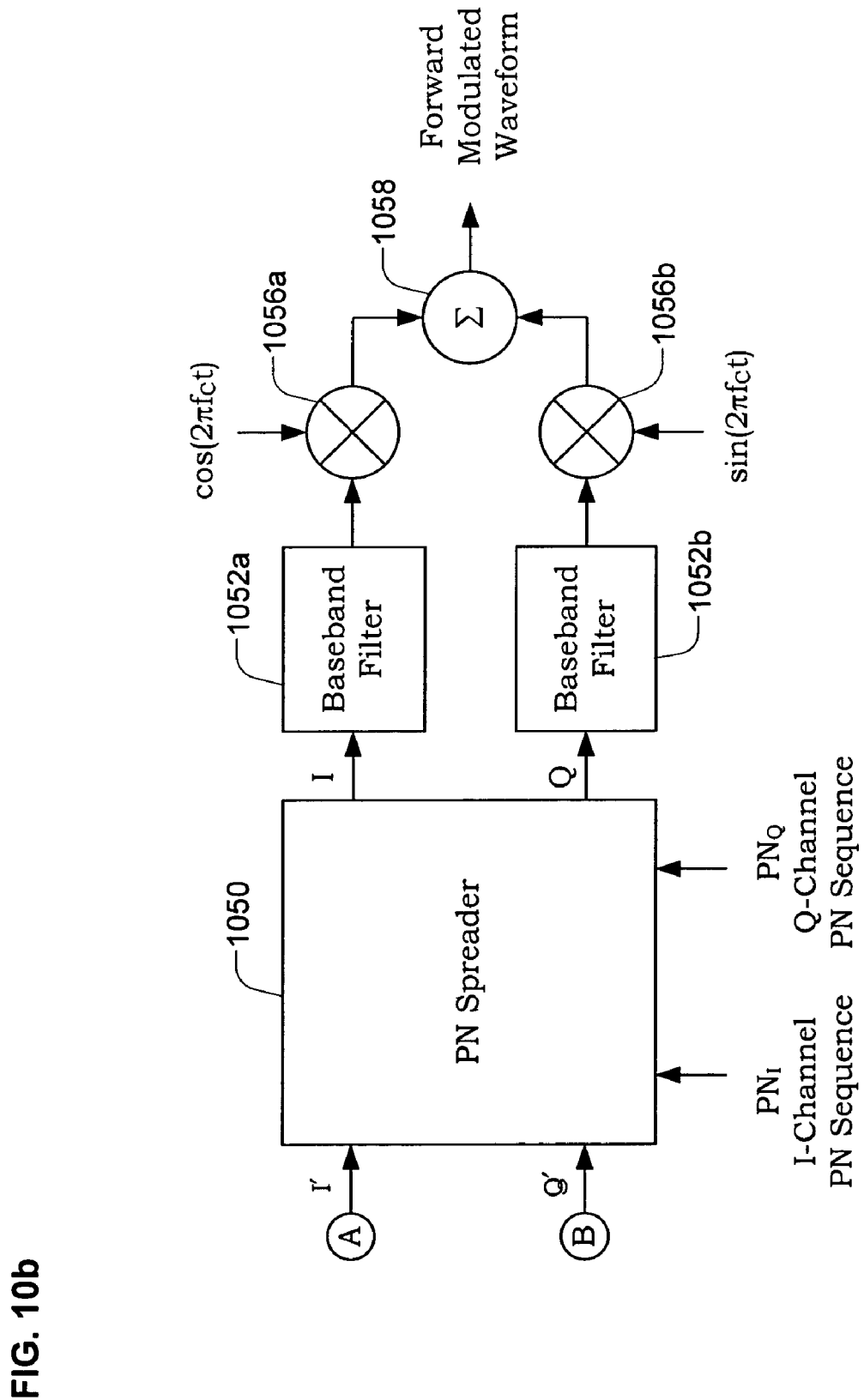

FIG. 10*a* and FIG. 10*b* show an example modem pool transceiver apparatus. In the example apparatus, RPC and fast access indicator bits are signal point mapped in signal point (SP) mapping units 1002. In an exemplary embodiment, SP mapping units 1002 perform bi-phase mapping, and convert 0, 1 to +1, −1 respectively.

Signal point mapped RPC bits for an access terminal are gain-controlled in a gain block 1003*a*. The gain-controlled RPC signals produced at the output of the gain block 1003*a* are mixed in with an RPC Walsh cover in a mixer 1004. The RPC Walsh cover corresponds to the MAC code channel assigned to the destination access terminal. Though only the gain block 1003*a* and the mixer 1004 necessary for one RPC code channel are shown, these elements may be repeated as necessary to accommodate a plurality of RPC code channels within the modem pool transceiver. One skilled in the art will recognize that the gain blocks 1003 and the mixers 1004 may be reversed, such that mixing occurs prior to gain adjustments, without departing from the scope of the present invention.

Signal point mapped fast access indicator bits are gain-controlled in a gain block 1003*b*. As described above, the modem pool transceiver transmits fast access indicator bits in response to the receipt of a fast access probe preamble. The gain-controlled fast access indicator signals produced at the output of gain block 1003*b* are mixed in with a fast access indicator Walsh cover in the mixer 1006. In an exemplary embodiment, the Walsh cover used for the fast access indicator is orthogonal to Walsh covers used for RPC signals.

In an alternate embodiment, the RPC and fast access indicator signals are code multiplexed using codes other than Walsh codes. In another embodiment, the RPC and fast access indicator signals are time division multiplexed.

The Walsh covered MAC code channel signals, including fast access indicator signals and all RPC signals, are summed together in a summer 1008. The resultant summed signals are repeated in a repeater 1010 to provide the appropriate number of chips for transmitting the MAC channel (308 in FIG. 3) on either side of the pilot burst (306 of FIG. 3). The MAC channel symbols output by the repeater 1010 are multiplexed with pilot and data channels in a time-domain multiplexer TDM block 1012. The multiplexed signal stream output by the TDM block 1012 are then multiplied by a complex PN code in a PN spreader 1050 in FIG. 10*b*. In an embodiment, the PN spreader 1050 complex-multiplies the complex input I' and Q' by the complex PN code $PN_I$ and $PN_Q$ according to the equations:

$$I = I'PN_I - Q'PN_Q$$

$$Q = I'PN_Q + Q'PN_I$$

In an alternate embodiment, the PN spreader 1050 multiplies the complex input I' and Q' by a single real PN sequence according to the equations:

$$I = I'PN$$

$$Q = Q'PN$$

Alternatively, other complex or real multiplication equations may be used. One skilled in the art will recognize that complex or real PN codes may be generated in a variety of ways.

The resultant complex product output by the PN spreader 1050 includes I and Q components that are each filtered in baseband filters 1052 and then upconverted in mixers 1056. The upconverted signals output by the mixers 1056 are added together in a summer 1058 to form the forward link signal to be amplified and transmitted by the modem pool transceiver.

The previous descriptions of exemplary embodiments are provided to enable any person skilled in the art to make or use the present invention. The various modifications to these embodiments will be readily apparent to those skilled in the art, and the generic principles defined herein may be applied to other embodiments without the use of the inventive faculty. For example, where the embodiments are described in terms of 32-ary Walsh functions, any other n-ary Walsh function such 16-ary or 64-ary Walsh functions or other types of orthogonal functions may be readily substituted. Also, the complex PN codes and complex PN spreaders may be readily substituted with simpler real PN codes and PN spreaders.

The components in the exemplary embodiments are described in general terms to illustrate the flexibility of the present invention. Each described component may be implemented using one or a combination of general-purpose microprocessors, digital signal processors (DSP), programmable logic devices, application specific integrated circuits (ASIC), or any other device designed to perform the functions described herein. Though the access terminal and modem pool transceiver are described in terms of a wireless communication system, the present invention may also be utilized in a network employing access terminals and modem pool transceivers connected by fiber optics or other wire-line technology.

Thus, the present invention is not intended to be limited to the embodiments shown herein but is to be accorded the widest scope consistent with the principles and novel features disclosed herein.

What is claimed is:

1. A method of establishing a connection between an access terminal and an access network, the method comprising:

transmitting a first portion of an access probe to the access network;

receiving from the access network a fast access indicator transmitted using a MAC code sub-channel; and transmitting, based on the fast access indicator, a fast connect reverse traffic channel signal from the access terminal to the access network, wherein the traffic channel signal comprises data rate control information.

2. The method of claim 1 wherein the fast access indicator is one bit.

3. The method of claim 1 further comprising decovering the fast access indicator using a predetermined fast access indicator Walsh code.

4. The method of claim 2 comprising decovering the fast access indicator using a predetermined fast access indicator Walsh code having a duration of 32 chips.

5. The method of claim 1 comprising decovering the fast access indicator using a predetermined fast access indicator Walsh code having a duration of 64 chips.

6. The method of claim 1 further comprising covering the data rate control information using a predetermined fast connect reverse traffic channel Walsh cover.

7. The method of claim 1 further comprising decoding a traffic channel assignment message received from the access network at a data rate based on the data rate control information.

8. The method of claim 1 further comprising decoding an access probe acknowledgment message received from the access network at a data rate based on the data rate control information.

9. The method of claim 1 further comprising receiving a reverse traffic channel acknowledgment from the access network at a data rate based on the data rate control information.

10. The method of claim 1 further comprising receiving a combined message from the access network at a data rate based on the data rate control information, the combined message comprising a traffic channel assignment message, an access probe acknowledgment message, and a reverse traffic channel acknowledgment.

11. The method of claim 1 wherein said first portion of an access probe is sent on a first fast access channel of a plurality of fast access channels that are staggered in time, and wherein said fast access indicator is sent during a fast access indicator slot immediately following said first portion.

12. The method of claim 1 wherein said first portion of an access probe is transmitted on a first fast access channel of a plurality of fast access channels, wherein each of said plurality of fast access channels uses a different PN long code, and wherein said fast access indicator is identified based on the timing of the first fast access channel.

13. The method of claim 1 further comprising covering said first portion of an access probe using a PN long code having a long code mask based on a system time value.

14. A method of establishing a connection between an access terminal and an access network comprising:
transmitting a first portion of an access probe to the access network;
receiving from the access network a fast access indicator transmitted using a MAC code sub-channel;
transmitting a traffic channel signal to the access network, the traffic channel signal comprising data rate control information; and
receiving a traffic channel assignment message from the access network at a data rate based on the data rate control information.

15. The method of claim 14 further comprising covering the data rate control information using a predetermined fast connect reverse traffic channel Walsh cover.

16. The method of claim 14 wherein the traffic channel assignment message is received in a single forward link message that further comprises an access probe acknowledgment message, and wherein the a single forward link message is received at a data rate based on the data rate control information.

17. The method of claim 14 wherein the traffic channel assignment message is received in a single forward link message that further comprises a reverse traffic channel acknowledgment message, and wherein the a single forward link message is received at a data rate based on the data rate control information.

18. The method of claim 14 wherein the traffic channel assignment message is received in a single forward link message that further comprises a reverse traffic channel acknowledgment message and an access probe acknowledgment message, and wherein the a single forward link message is received at a data rate based on the data rate control information.

19. The method of claim 14 further comprising decoding an access probe acknowledgment message received from the access network at a data rate based on the data rate control information.

20. The method of claim 14 further comprising receiving a reverse traffic channel acknowledgment from the access network at a data rate based on the data rate control information.

21. The method of claim 14 further comprising:
transmitting a fast access probe preamble from the access terminal to the access network; and
receiving from the access network on a fast access indicator channel a fast access indicator corresponding to the fast access probe preamble.

22. The method of claim 21 wherein the fast access indicator is one bit.

23. The method of claim 21 further comprising decovering the fast access indicator using a predetermined fast access indicator Walsh code.

24. The method of claim 21 further comprising decovering the fast access indicator using a predetermined fast access indicator Walsh code having a duration of 32 chips.

25. The method of claim 21 further comprising decovering the fast access indicator using a predetermined fast access indicator Walsh code having a duration of 64 chips.

26. The method of claim 21 wherein said fast access probe preamble is sent on a first fast access channel of a plurality of fast access channels that are staggered in time, and wherein said fast access indicator is sent during a fast access indicator slot immediately following said first portion.

27. The method of claim 21 wherein said fast access probe preamble is transmitted on a first fast access channel of a plurality of fast access channels, wherein each of said plurality of fast access channels uses a different PN long code, and wherein said fast access indicator is identified based on the timing of the first fast access channel.

28. The method of claim 21 further comprising covering said first portion of an access probe using a PN long code having a long code mask based on a system time value.

29. A method of establishing a connection between an access terminal and an access network comprising:
receiving a first portion of an access probe from the access terminal;
transmitting a fast access indicator from the access network using a MAC code sub-channel;
receiving data rate control information from the access terminal; and
transmitting a traffic channel assignment message to the access terminal at a data rate based on the data rate control information.

30. The method of claim 29 wherein the fast access indicator is one bit.

31. The method of claim 29 further comprising covering the fast access indicator using a predetermined fast access indicator Walsh code.

32. The method of claim 29 further comprising covering the fast access indicator using a predetermined fast access indicator Walsh code having a duration of 32 chips.

33. The method of claim 29 further comprising covering the fast access indicator using a predetermined fast access indicator Walsh code having a duration of 64 chips.

34. The method of claim 29 further comprising decovering the data rate control information using a predetermined fast connect reverse traffic channel Walsh cover.

35. The method of claim 29 further comprising transmitting to the access terminal an access probe acknowledgment message at a data rate based on the data rate control information.

36. The method of claim 29 further comprising transmitting a reverse traffic channel acknowledgment to the access terminal at a data rate based on the data rate control information.

37. The method of claim 29 wherein the traffic channel assignment message is transmitted in a single forward link message that further comprises a reverse traffic channel acknowledgment message and an access probe acknowledgment message, and wherein the single forward link message is transmitted at a data rate based on the data rate control information.

38. The method of claim 29 wherein said first portion of an access probe is received on a first fast access channel of a plurality of fast access channels that are staggered in time, and wherein said fast access indicator is transmitted during a fast access indicator slot immediately following said first portion.

39. The method of claim 29 further comprising despreading a first fast access channel of a plurality of fast access channels, wherein each of said plurality of fast access channels uses a different PN long code, and wherein said first portion of an access probe is received on the first access channel.

40. The method of claim 29 further comprising despreading said first portion of an access probe using a PN long code having a long code mask based on a system time value.

41. A method of establishing a connection between an access terminal and an access network comprising:
receiving a first portion of an access probe from the access terminal;
transmitting a fast access indicator from the access network using a MAC code sub-channel;
receiving data rate control information from the access terminal; and
transmitting a combined message to the access terminal at a data rate based on the data rate control signal, the combined message comprising a traffic channel assignment message, an access probe acknowledgment message, and a reverse traffic channel acknowledgment.

42. The method of claim 41 wherein the fast access indicator is one bit.

43. The method of claim 41 further comprising covering the fast access indicator using a predetermined fast access indicator Walsh code.

44. The method of claim 41 further comprising covering the fast access indicator using a predetermined fast access indicator Walsh code having a duration of 32 chips.

45. The method of claim 41 further comprising covering the fast access indicator using a predetermined fast access indicator Walsh code having a duration of 64 chips.

46. The method of claim 41 further comprising decovering the data rate control information using a predetermined fast connect reverse traffic channel Walsh cover.

47. The method of claim 41 wherein said first portion of an access probe is received on a first fast access channel of a plurality of fast access channels that are staggered in time, and wherein said fast access indicator is transmitted during a fast access indicator slot immediately following said first portion.

48. The method of claim 41 further comprising despreading a first fast access channel of a plurality of fast access channels, wherein each of said plurality of fast access channels uses a different PN long code, and wherein said first portion of an access probe is received on the first access channel.

49. The method of claim 41 further comprising despreading said first portion of an access probe using a PN long code having a long code mask based on a system time value.

50. An access terminal apparatus comprising:
means for transmitting a first portion of an access probe to the access network;
means for receiving from the access network a fast access indicator transmitted using a MAC code sub-channel; and
means for transmitting, based on the fast access indicator, a fast connect reverse traffic channel signal from the access terminal to the access network, wherein the traffic channel signal comprises data rate control information.

51. An access network apparatus comprising:
means for receiving a first portion of an access probe from the access terminal;
means for transmitting a fast access indicator from the access network using a MAC code sub-channel;
means for receiving data rate control information from the access terminal; and
means for transmitting a traffic channel assignment message to the access terminal at a data rate based on the data rate control information.

\* \* \* \* \*